G. S. MAXWELL.
DEMOUNTABLE RIM.
APPLICATION FILED NOV. 29, 1915.
1,193,810. Patented Aug. 8, 1916.
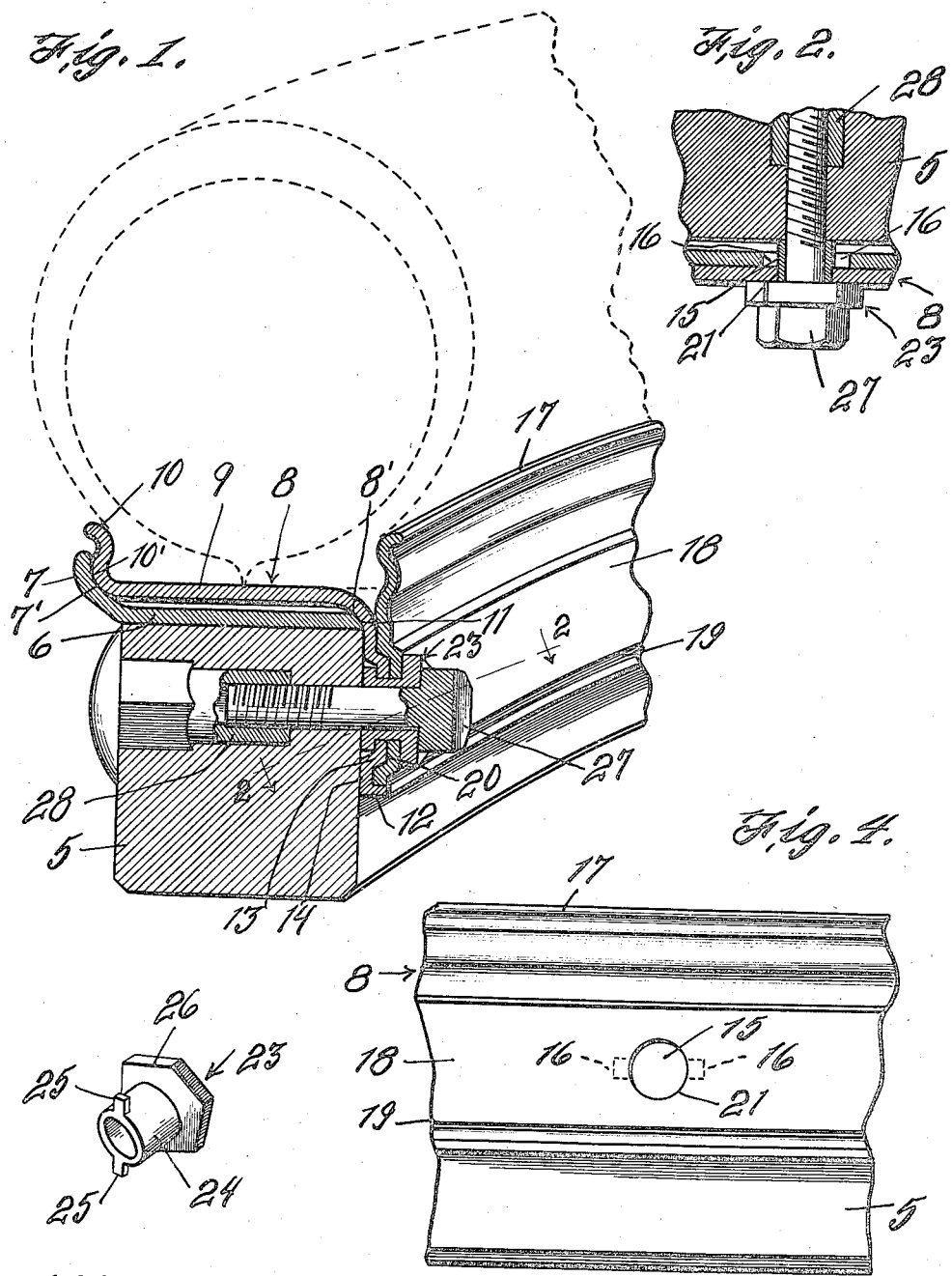
Inventor
George S. Maxwell
By C. L. Parker
Attorney
Witnesses
Wynne Johnson

UNITED STATES PATENT OFFICE.

GEORGE S. MAXWELL, OF WASHINGTON, DISTRICT OF COLUMBIA, ASSIGNOR OF ONE-HALF TO MAYNARD A. BAYLES, OF WASHINGTON, DISTRICT OF COLUMBIA, AND WILLIAM F. HALE, OF NOKESVILLE, VIRGINIA.

DEMOUNTABLE RIM.

1,193,810.  Specification of Letters Patent.  Patented Aug. 8, 1916.

Application filed November 29, 1915. Serial No. 64,124.

*To all whom it may concern:*

Be it known that I, GEORGE S. MAXWELL, a citizen of the United States, residing at Washington, in the District of Columbia, have invented certain new and useful Improvements in Demountable Rims, of which the following is a specification.

My invention relates to improvements in demountable rims for holding a tire or inflated tire upon the felly of a wheel.

An important object of the invention is to provide means whereby the tire and its demountable rim may be conveniently and expeditiously placed upon and removed from the wheel, or one separable member or major portion of the rim remain upon the wheel, while the tire is removed from such member and the wheel, whereby access can be had to the inner tube within the tire casing or shoe, in the usual manner.

A further object of the invention is to provide means of the above mentioned character, which are simple in construction, inexpensive to manufacture, light, strong, durable, and convenient in use.

Other objects and advantages of the invention will be apparent during the course of the following description.

In the accompanying drawings forming a part of this specification and in which like numerals are employed to designate like parts throughout the same, Figure 1 is a fragmentary perspective view, parts in section, of a rim embodying the invention, Fig. 2 is a longitudinal sectional view, taken on line 2—2 of Fig. 1, Fig. 3 is a perspective view of a locking member, and, Fig. 4 is a fragmentary side elevation of the rim.

In the drawings, wherein for the purpose of illustration is shown a preferred embodiment of my invention, the numeral 5 designates the felly of a wheel, having a permanent rim 6, rigidly attached to its periphery, by any suitable means. At one edge this permanent rim is bent upwardly in the form of a retaining flange 7, having an inclined portion 7', as shown. The opposite edge of the rim 6 is inclined or beveled in the same direction with the inclined portion 7', as shown at 8'.

My improved demountable rim 8 is formed in two separable members.

The numeral 9 designates the body portion of one member of the rim, constituting the major portion of the rim, which body portion is annular and provided at one edge with an outwardly extending annular flange 10, having an inclined portion 10', adapted to contact with the inclined portion 7', as shown. The body portion 9 has its opposite edge bent inwardly, as shown at 11, to contact with the inclined portion 8' of the rim 6, and providing an extension or annular flange 12, adapted to contact with one side of the felly 5, as shown. The extension or flange 12 has its material outwardly off-set, as shown at 13, providing an interior recess 14. The off-set portion 13 is provided with circular openings 15, having extensions 16 as more clearly shown in Figs. 2 and 4.

The co-acting separable member of the demountable rim comprises a flange 17, provided with an extension 18, which is preferably annular and off-set outwardly, as shown at 19, forming a recess 20, to receive the off-set portion 13. The off-set portion 18 is provided with openings 21 adapted for registration with the openings 15.

The numeral 23 designates a detachable locking device as a whole, comprising a cylindrical tubular body portion 24, adapted for insertion within the openings 15 and 21 and having lugs 25 secured to its inner end. These lugs are adapted to pass through the openings 16, when brought in alinement therewith. The tubular body portion 23 is provided with a head 26, which is preferably other than round, so that it may be conveniently turned. Particular attention is called to the fact that the locking device is permanently loosely secured to the flange 17 and cannot become separated therefrom. When the locking device 23 is inserted within the opening 21, and the lugs 25 are vertically arranged, the separable tire holding members of the demountable rim are securely bound together, and the rim holding the inflated tire may be bodily removed from the felly, while these parts remain assembled.

By turning the locking member 23 so that its lugs are brought into alinement with the opening extensions 21, the flange or member 17 may be readily separated from the major co-acting member.

Separate means are provided to lock the separable tire holding members of the rim, when assembled, upon the felly 5, comprising bolts 27, adapted to be inserted through the tubular body portions 24 and to have screw-threaded engagement within tubular sockets 28, rigidly secured to or embedded within the felly 5, as shown. It is thus obvious that any suitable number of locking members 23 and bolts 27 will be employed, as may be found advantageous.

In use, the tire casing or shoe containing the inner tube is placed upon the body portion 9 of the major tire holding member, by first removing the co-acting member or flange 17, which is subsequently returned to its place in contact with the flange 13, and locked thereto by the locking devices 23.

The demountable rim comprising the assembled separable tire holding members may be placed upon and removed from the felly 5, while remaining assembled and holding the inflated tire. When the bolts 27 are inserted through the tubular body portions 24 and screwed into the sockets 28, the demountable rim is securely locked to the felly.

When it is desired to gain access to the inner tube of the tire, the bolts 27 are first removed and the locking members 23 manipulated to disconnect the flange 17 from the body portion 9. When this is done, the tire may be removed from the major tire holding member, which remains upon the felly of the wheel, and access is had to the inner tube in the usual manner.

Particular attention is called to the fact that the body portion 9 of the major tire holding member is formed of suitably resilient material, such as sheet metal, with its resiliency occurring principally at its angular portion or point of bending 11, so that when pressure is applied to the flange 12 thereof by tightening up the bolts 27, the flange 10 will tend to move outwardly along the inclined portion 7' of the flange 7, and the inclined portion of the body portion 9 near or at its point of bending will tend to move along the inclined portion 8', when contacting therewith, thus effecting a firm engagement between the body portion 9 and the permanent rim 6 at their points of contact. The flange 10 engages the flange 7 before the bent portion 11 engages the inclined portion 8' of the rim 6, and the latter engagement is insured by the resiliency of the flange 12.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. A demountable rim for securing a tire upon the felly of a wheel, comprising separable tire holding members, tubular locking elements serving to detachably connect the tire holding members, and means to detachably connect the tire holding members with the felly of the wheel comprising elements passing through the tubular locking elements.

2. In apparatus of the character described, a pair of coacting members for holding a tire and having flanges provided with openings, tubular elements adapted for insertion within the openings and serving to detachably lock the flanges together, and bolts extending through the tubular elements and adapted for connection with the felly of the wheel.

3. In apparatus of the character described, a tire holding member adapted to be removably mounted upon the felly of a wheel and carrying a flange having apertures with laterally extending openings leading into the apertures, a coacting tire holding member having a flange to be arranged adjacent the first named flange and having apertures adapted for registration with the first named apertures, tubular locking elements adapted for insertion within the apertures and provided with laterally extending elements to pass through the laterally extending openings in the first named flange, bolts extending through the tubular locking elements, and means for securing the bolts to the felly of the wheel.

In testimony whereof I affix my signature in presence of two witnesses.

GEORGE S. MAXWELL.

Witnesses:
   James L. Crawford,
   B. P. Fishburne.